United States Patent [19]

Rhodes et al.

[11] Patent Number: 5,223,579
[45] Date of Patent: Jun. 29, 1993

[54] SOLID VISCOSITY INDEX IMPROVERS WHICH PROVIDE EXCELLANT LOW TEMPERATURE VISCOSITY

[75] Inventors: Robert B. Rhodes, Houston; Harvey E. Atwood, Kingwood, both of Tex.

[73] Assignee: Shell Oil Company, Houston, Tex.

[21] Appl. No.: 646,024

[22] Filed: Jan. 28, 1991

[51] Int. Cl.$^5$ .............. C08F 297/04; C10M 143/10; C10M 143/12
[52] U.S. Cl. ............... 525/314; 525/250; 525/271; 252/43
[58] Field of Search ............. 525/314, 250, 271

[56] References Cited

U.S. PATENT DOCUMENTS

| | | | |
|---|---|---|---|
| 3,700,633 | 10/1972 | Wald et al. | 260/880 B |
| 3,772,196 | 11/1973 | St. Clair et al. | 252/32.7 E |
| 3,775,329 | 11/1973 | Eckert | 252/59 |
| 3,792,127 | 2/1974 | Gillies | 525/314 |
| 3,823,203 | 7/1974 | De La Mane | 525/314 |
| 4,081,390 | 3/1978 | Richardson | 252/59 |
| 4,104,330 | 8/1978 | Danzig et al. | 525/314 |
| 4,152,370 | 5/1979 | Moczygemba | 525/314 |
| 4,194,057 | 3/1980 | Brankling et al. | 585/11 |
| 4,412,087 | 10/1983 | Trepka | 585/12 |
| 4,418,234 | 11/1983 | Schiff et al. | 585/12 |
| 4,689,368 | 8/1987 | Jenkins | 525/314 |
| 4,704,434 | 11/1987 | Kitchen et al. | 525/314 |

Primary Examiner—Vasu S. Jagannathan
Attorney, Agent, or Firm—Keith M. Tackett

[57] ABSTRACT

A solid, cyclone-finishable polymer which does not exhibit cold flow and provides an unexpected balance of viscosity improving properties for oil compositions is produced by hydrogenating a copolymer comprising a homopolymer block of isoprene connected to a copolymer block of isoprene and a monoalkenyl aromatic hydrocarbon. The amount of the monoalkenyl aromatic hydrocarbon is sufficient to allow cyclone finishing although sufficiently distributed to provide oil compositions having good low temperature viscosity. Prior to hydrogenation, the copolymers have a number average molecular weight between 125,000 and 275,000, preferably 150,000 to 240,000, and a total monoalkenyl aromatic content between 10 and 2 percent by weight, preferably between 7 and 3 percent. The copolymer is hydrogenated to substantially saturate the isoprene and to reduce the size of monoalkenyl aromatic segments in the copolymer block.

6 Claims, No Drawings

SOLID VISCOSITY INDEX IMPROVERS WHICH PROVIDE EXCELLANT LOW TEMPERATURE VISCOSITY

BACKGROUND

This invention relates to polymers useful as a viscosity index improver and to oil compositions compromising the same. More particularly, this invention relates to hydrogenated copolymers of isoprene and a monoalkenyl aromatic hydrocarbon.

As is well known, the viscosity of lubricating oils varies with temperature, and it is important that the oil not be too viscous (thick) at low temperature nor too fluid (thin) at higher temperature. The variation in the viscosity-temperature relationship of an oil is indicated by the so-called viscosity index (VI). The higher the viscosity index, the less the change in viscosity with temperature. In general, the viscosity index is a function of the oils viscosity at a given lower temperature and a given higher temperature. The given lower temperature and the given higher temperature for lubricating oils have varied over the years but are fixed at any given time in an ASTM test procedure (ASTM D2270). Currently the lower temperature specified in the test is 40° C. and the higher temperature specified in the test is 100° C.

The thickening efficiency of a polymeric VI improver is an important, and frequently, the principal consideration in its selection for use in oil compositions. Polymeric VI improvers which significantly increase the high temperature kinematic viscosity without appreciably increasing the low temperature kinematic viscosity are preferred. The thickening efficiency of any given polymeric VI improver will vary with polymer composition and structure but will increase with increased molecular weight. Other properties are important including the ability of the VI improver to maintain an increase in viscosity even after subjected to mechanical shear; the high temperature, high shear rate (HTHSR) viscosity response of an oil composition containing the viscosity index improver; the low temperature viscosity response of an oil containing the viscosity index improver; the engine pumpability of a lubricating oil composition containing the viscosity index improver; and the low temperature startability of an engine containing the lubricating oil composition. It should be noted that viscosity index improvers which are solid and do not exhibit cold flow are particularly preferred for ease in packaging and handling. Polymers of this type are usually, but not always, capable of being separated from solvent during manufacture by means of cyclone-finishing techniques.

Block copolymers comprising a single polymeric block of a monoalkenyl aromatic hydrocarbon compound and a single polymeric block of isoprene offer a good balance of viscosity index improver properties as taught in U.S. Pat. No. 3,772,196. However, these polymers comprise relatively high monoalkenyl aromatic hydrocarbon contents which give lower HTHSR responses than polymers having similar molecular weights and less of the monoalkenyl aromatic hydrocarbons.

A viscosity index improver having a relatively small amount of monoalkenyl aromatic hydrocarbon is taught in U.S. Pat. No. 3,775,329 which describes tapered copolymers of isoprene and monoalkenyl aromatic hydrocarbon monomers. Although the patent excludes the use of randomizers, it is asserted that the tapered copolymers do not have significant homopolymer blocks of isoprene or the monoalkenyl aromatic hydrocarbons. The described VI improvers include non-cyclone finishable VI improvers, VI improvers which provide relatively low HTHSR responses in multigrade oils, and VI improvers with low thickening efficiencies.

U.S. Pat. No. 4,418,234 describes diene block copolymers which have high vinyl contents and provide good high shear rate responses. For any molecular weight, an increase in vinyl content lowers the thickening efficiency of the VI improver. The patent asserts that randomizers can be used as long as the total amount of homopolymer blocks of monoalkenyl aromatic hydrocarbon is less than about 5 percent by weight, preferably less than about 2 percent.

SUMMARY OF THE INVENTION

A solid, cyclone-finishable polymer which does not exhibit cold flow and provides an unexpected balance of viscosity improving properties for oil compositions is produced by hydrogenating a copolymer comprising a homopolymer block of isoprene connected to a copolymer block of isoprene and a monoalkenyl aromatic hydrocarbon. The amount of the monoalkenyl aromatic hydrocarbon is sufficient to allow cyclone finishing although sufficiently distributed to provide oil compositions having good low temperature viscosity. Prior to hydrogenation, the copolymers have a number average molecular weight between 125,000 and 275,000, preferably 150,000 to 240,000, and a total monoalkenyl aromatic content between 10 and 2 percent by weight, preferably between 7 and 3 percent. The copolymer is hydrogenated to substantially saturate the isoprene and to reduce the size of monoalkenyl aromatic segments in the copolymer block.

DETAILED DESCRIPTION OF THE INVENTION

A cyclone-finishable polymer useful for improving the viscosity index of a lubricating oil is produced by anionically polymerizing a copolymer having a number average molecular weight between 125,000 and 275,000, from 90 to 98 percent by weight of isoprene, from 10 to 2 percent by weight of a monoalkenyl aromatic hydrocarbon, and a structure of A—A/B wherein A is a homopolymer block of the hydrogenated isoprene and A/B is a copolymer block of the hydrogenated isoprene and a monoalkenyl aromatic hydrocarbon. At least 85% of the isoprene units, preferably at least 93%, have the 1,4-configuration and the homopolymer block of the isoprene comprises at least 60% of the copolymer by weight. The copolymer is hydrogenated to saturate at least 95% of the isoprene units and at least 5% of the monoalkenyl aromatic hydrocarbon units.

The polymers of this invention are cylcone-finishable as a solid polymer crumb and do not exhibit cold flow. Oil compositions containing the polymers have a good balance between high temperature, high shear rate viscosity response; low temperature viscometric response; engine oil pumpability and low temperature startability.

The block copolymer useful as a VI improver in the present invention may be prepared in at least two different ways. The polymerization may be completed by placing a desired amount of isoprene into a reaction vessel and, after polymerizing about 60 to about 90% of the polymer as a homopolymer block, the desired amount of monoalkenyl aromatic hydrocarbon monomer may then be added. In the absence of a randomizing agent, the mixture of isoprene and monoalkenyl aromatic hydrocarbon adds a tapered copolymer block to the initial isoprene block. Process conditions for making tapered copolymer blocks are the same as for making tapered copolymers which are described in U.S. Pat. No. 3,775,329 which is incorporated by reference herein. Alternatively, polymerization may be initiated by placing the amount of isoprene to be incorporated into the homopolymer isoprene polymer block in a reaction vessel and allowing the isoprene to react to substantial completion before adding isoprene and monoalkenyl aromatic hydrocarbon monomer in the absence or randomizing agents to polymerize the copolymer block. In either case, addition of the monoalkenyl aromatic hydrocarbon late in the polymerization results in a large homopolymer block of isoprene connected to a copolymer block having sufficient segments of the monoalkenyl aromatic hydrocarbon to be cyclone-finishable. Polymers having higher total molecular weights generally require less amounts of the monoalkenyl aromatic hydrocarbon to be cyclone-finishable as a polymer crumb.

Prior to hydrogenation, the copolymers have a number average molecular weight between 125,000 and 275,000, preferably between 150,000 and 240,000. The hydrogenated isoprene homopolymer blocks have number average molecular weights within the range from about 75,000 to about 250,000, preferably 90,000 to 225,000. Molecular weight as used herein is the molecular weight as determined from the peak value using GPC techniques.

U.S. Pat. No. 3,772,196 which is incorporated by reference herein teaches the use of an organo metallic compound, particularly lithium compounds, to prepare isoprene polymers having high 1,4 contents and these compounds are particularly preferred for use in preparing the isoprene polymer which is useful in the present invention. Suitable organo metallic compounds containing one or more lithium atoms include, generally, compounds satisfying the general formula $RLi_n$ wherein n may be 1 or 2. Suitable organo metallic compounds containing a single lithium atom which are useful in preparing the viscosity index improver of the present invention include, but are not limited to, compounds wherein R is unsaturated such as allyl lithium, methallyl lithium and the like; compounds where R is aromatic such as phenyl lithium, tolyl lithium, zyllyl lithium, naphthyl lithium and the like; and compounds wherein R is an alkyl unit such as methyl lithium, ethyl lithium, propyl lithium, butyl lithium, amyl lithium, hexyl lithium, 2-ethyl hexyl lithium, n-hexadecyl lithium and the like. Secondary-butyl lithium is a most preferred initiator for use in preparing the VI improver of the present invention.

The polymerization to prepare the VI improver of the present invention will be completed in a suitable solvent useful in the preparation of block copolymers containing a conjugated diolefin and a monoalkenyl aromatic hydrocarbon monomer. Suitable solvents include, generally, hydrocarbon solvents such as paraffins, cycloparaffins, alkyl substituted cyclo paraffins, aromatics and alkyl substituted aromatics containing from about 4 to about 10 carbon atoms per molecule. Suitable solvents include, but are not limited to, benzene, toluene, cyclohexane, methylcyclohexane, n-butane, n-hexane, n-heptane, and the like. Cyclohexane is preferred.

Suitable monoalkenyl aromatic hydrocarbon monomers useful for preparing the VI improvers of this invention include, but are not necessarily limited to, styrene, various alkyl-substituted styrenes, alkoxy substituted styrenes, vinyl naphthalene, alkyl-substituted vinyl naphthalenes and the like. Of these, styrene is particularly preferred.

Preparation of the block copolymer useful as the VI improver of this invention may be completed at a temperature broadly, within the range from about 20° C. to about 100° C., preferably at a temperature within the range from about 50° C. to about 70° C. The copolymerization reaction is carried out in an inert atmosphere, preferably under a nitrogen blanket, and the polymerization will be carried out, generally, under pressure, for example, at a pressure within the range from about 0.5 to about 10 bars. The concentration of initiator during the polymerization may vary over a relatively wide range but will be controlled in combination with the monomer concentration so as to produce blocks within the polymer having the desired molecular weight.

The block copolymer useful as a VI improver in this invention is hydrogenated at conditions sufficient to hydrogenate at least 95% of the isoprene units and at least 5% of the monoalkenyl aromatic hydrocarbon units. Preferably, from 10 to 20% of aromatic unsaturation is hydrogenated. Hydrogenation at these levels is very reproducible for copolymers having from 10 to 2% by weight of monoalkenyl aromatic hydrocarbon units as determined by NMR integration of the aromatic protons.

A particular preferred method for selectively hydrogenating the block copolymer useful in this invention is described in U.S. Pat. No. 3,700,633, the disclosure of which patent is herein incorporated by reference. In the process taught in U.S. Pat. No. 3,700,633 hydrogenation of the block copolymer is accomplished in the same solvent as was used during the polymerization using a hydrogenation catalyst comprising the reaction product of an aluminum alkyl and a nickel or cobalt carboxylate or alkoxide. In general, hydrogenation is accomplished at a temperature within the range from about 25° C. to about 175° C. at a hydrogen partial pressure of at least 50 psig, and usually at a hydrogen partial pressure within the range from about 250 to about 1500 psig. In general, contacting times within the range from about 5 minutes to about 8 hours will be sufficient to permit the desired degree of hydrogenation. In general, the selectively hydrogenated block copolymer may be recovered as a crumb using known techniques.

The selectively hydrogenated block copolymer of this invention may be added to a variety of oils including crude oil, mineral and synthetic oils, lubricating oils, diesel oils, hydraulic oils, automatic transmission oils and the like. In general, the concentration of the selectively hydrogenated block copolymer in such oils may vary between wide limits with amounts within the range from about 0.2 to about 3 weight percent being most common. Concentrations within the range from about 0.4 to about 2 weight percent are preferred and concentrations within the range from about 0.5 to about 1.5 weight percent are most preferred. Lubricating oil compositions prepared with the selectively hydrogenated block copolymer of this invention may also contain other additives such as anti-corrosive additives, anti-oxidants, detergents, pour point depressants, antiwear/extreme-pressure agents, one or more additional VI improvers and the like. Typical additives which are useful in the lubricating oil compositions of this invention and their description will be found in U.S. Pat. Nos. 3,772,196 and 3,835,083, the disclosure of which patents are herein incorporated by reference.

The preferred viscosity index improver prior to hydrogenation has the structure A—A/B—B wherein the number average molecular weight of the copolymer is between 150,000 and 240,000, the styrene content is between 7% and 3%, the homopolymer block of isoprene comprises at least 75% of the copolymer by weight, and B is a homopolymer block of styrene having a number average molecular weight of at least 4,000, most preferably at least 6,000.

The preferred polymers are anionically polymerized in a cyclohexane solution until the solution contains 15 to 50 weight percent of the polymer. Polymerization occurs under a nitrogen blanket at a nitrogen partial pressure within the range from about 0.5 to about 2 bar.

After the polymerization reaction is completed, the preferred copolymers are hydrogenated in the presence of a catalyst prepared by combining triethyl aluminium and nickel 2-ethylhexanoate. The hydrogenation will most preferably reduce the saturation of the isoprene to less than 98% of the ethylenic unsaturation originally contained in the copolymer and saturate from 10% to 30% of the styrene to give a total styrene content between 6 and 4% by weight for polymers having a number average molecular weight between 190,000 and 210,000.

Having thus broadly described the present invention and a preferred embodiment thereof, it is believed that the invention will become even more apparent by reference to the following examples. It will be appreciated, however, that the examples are presented solely for purposes of illustration and should not be construed as limiting the invention unless a limitation introduced specifically in the examples is also incorporated specifically into the claims appended hereto.

EXAMPLES

In the following examples, copolymers described and claimed in this application were made and compared with known copolymers to establish improved properties and performance as a VI improver. All of the copolymers were formulated into SAE 10W-40 and SAE 5W-30 multigrade lubricating oil compositions. The copolymers within the scope of the present invention were cyclone-finishable as a solid polymer crumb and exhibited good viscometric properties.

EXAMPLE 1

Living isoprene blocks were prepared by anionically polymerizing about 85% of an initial charge of 67.39 lbs. of isoprene in cyclohexane. The polymerization reaction was promoted by sec-butyllithium in the absence of any randomizing compounds. The living isoprene blocks had at least 93% 1,4-polymerized isoprene units. Polymerization continued after the addition of 4.64 lbs. of styrene until the number average molecular weight of the copolymer was 189,100 as measured by GPC. The copolymer had a polystyrene content of 6.5% by NMR and a total molecular weight of the thermal polystyrene blocks of 7,800 as measured by GPC on the solid material recovered after ozone degradation of the polymer prior to hydrogenation.

The copolymer was hydrogenated with a catalyst composition comprising nickel and triethyl aluminum with Al/Ni ratio from 2.1 to 2.5. The catalyst composition was prepared as a masterbatch and used for all of the examples. Hydrogenation also reduced the polystyrene content to 5.1%. The copolymer was recovered as a solid polymer crumb which did not exhibit cold flow.

The hydrogenated copolymer was added to an oil composition which contained 9.1% by weight of an experimental additive package, 0.3% Hitec 623 which is a pour point depressant, and the balance was HVI 100N oil. The oil composition contained an amount of the copolymer effective to give a kinematic viscosity of 11 centistokes at 100 C and a SAE grade of 5W-30.

The hydrogenated copolymer was also added to oil compositions which contained 31% by weight HVI 250N (DP) oil, 7.75% by weight of an additive package sold as Lubrizol 7573A, 0.3% Acryloid 160 pour point depressant, and the balance was HVI 100N oil. The oil composition contained an amount of the copolymer effective to give a kinematic viscosity of 14 centistokes at 100° C. and an SAE grade of 10W-40.

The low temperature viscosity of the oil compositions were measured according to ASTM D-4684 and the results are reported in the following Table for comparison with subsequent examples.

EXAMPLE 2

Living isoprene blocks were prepared by anionically polymerizing about 85% of an initial charge of 14.76 lbs. of isoprene in cyclohexane. The polymerization reaction was promoted by sec-butyllithium in the absence of any randomizing compounds. The living isoprene blocks had at least 93% 1,4-polymerized isoprene units. Polymerization continued after the addition of 1.02 lbs. of styrene until the number average molecular weight of the copolymer was 201,400. The copolymer had a polystyrene content of 6.2% by NMR and a total molecular weight of 9,100 as measured by GPC according to Example 1.

The copolymer was hydrogenated as described for Example 1. Hydrogenation reduced the polystyrene content to 5.4%. The copolymer was recovered as a solid polymer crumb which did not exhibit cold flow.

The hydrogenated copolymer was added to oil compositions as described in Example 1. The low temperature viscosity of the oil compositions were measured according to ASTM D-4684 and the results are reported in the following Table.

EXAMPLE 3

Living isoprene blocks were prepared by anionically polymerizing about 85% of an initial charge of 18.71 lbs. of isoprene in cyclohexane. The polymerization reaction was promoted by sec-butyllithium in the absence of any randomizing compounds. The living isoprene blocks had at least 93% 1,4-polymerized isoprene units. Polymerization continued after the addition of 1.27 lbs. of styrene until the number average molecular weight of the copolymer was 231,000. The copolymer had a polystyrene content of 6.4% and the total molecular weight of block polystyrene was 10,800 as measured by GPC prior to hydrogenation according to Example 1.

The copolymer was hydrogenated as described for Example 1. Hydrogenation reduced the polystyrene content to 4.5%. The copolymer was recovered as a solid polymer crumb which did not exhibit cold flow.

The hydrogenated copolymer was added to oil compositions as described in Example 1. The low temperature viscosity of the oil compositions were measured according to ASTM D-4684 and the results are reported in the following Table.

EXAMPLE 4

Living isoprene blocks were prepared by anionically polymerizing about 85% of an initial charge of 56.20 lbs. of isoprene in cyclohexane. The polymerization reaction was promoted by sec-butyllithium in the absence of any randomizing compounds. The living isoprene blocks had at least 93% 1,4-polymerized isoprene units. Polymerization continued after the addition of 3.89 lbs. of styrene until the number average molecular weight of the copolymer was 262,400. The copolymer had a polystyrene content of 6.3% and the total molecular weight of block polystyrene was 9,900 as measured by GPC prior to hydrogenation according to Example 1.

The copolymer was hydrogenated as described for Example 1 although the extent of hydrogenation was not measured. The copolymer was recovered as a solid polymer crumb which did not exhibit cold flow.

The hydrogenated copolymer was added to oil compositions as described in Example 1. The low temperature viscosity of the oil compositions were measured according to ASTM D-4684 and the results are reported in the following Table.

EXAMPLE 5

Living isoprene blocks were prepared by anionically polymerizing about 85% of an initial charge of 15.44 lbs. of isoprene in cyclohexane. The polymerization reaction was promoted by sec-butyllithium in the absence of any randomizing compounds. The living isoprene blocks at least 93% 1,4-polymerized isoprene units. Polymerization continued after the addition of 1.060 lbs. of styrene until the number average molecular weight of the copolymer was 204,800. The copolymer had a polystyrene content of 6.8% and the total molecular weight of block polystyrene was 10,200 as measured by GPC prior to hydrogenation according to Example 1.

The copolymer was hydrogenated as described for Example 1. Hydrogenation reduced the polystyrene content to 5.8%. The copolymer was recovered as a solid polymer crumb which did not exhibit cold flow.

The hydrogenated copolymer was added to oil compositions as described in Example 1. The low temperature viscosity of the oil compositions were measured according to ASTM D-4684 and the results are reported in the following Table.

EXAMPLE 6

Living isoprene blocks were prepared by anionically polymerizing about 85% of an initial charge of 13.66 lbs. of isoprene in cyclohexane. The polymerization reaction was promoted by sec-butyllithium in the absence of any randomizing compounds. The living isoprene blocks had at least 93% 1,4-polymerized isoprene units. Polymerization continued after the addition of 0.97 lbs. of styrene until the number average molecular weight of the copolymer was 216,400. The copolymer had a polystyrene content of 6.9% and the total molecular weight of block polystyrene was 11,300 as measured by GPC prior to hydrogenation according to Example 1.

The copolymer was hydrogenated as described for Example 1. Hydrogenation reduced the polystyrene content to 6.5%. The copolymer was recovered as a solid polymer crumb which did not exhibit cold flow.

The hydrogenated copolymer was added to oil compositions as described in Example 1. The low temperature viscosity of the oil compositions were measured according to ASTM D-4684 and the results are reported in the following Table.

EXAMPLE 7 (Comparison)

Living isoprene blocks were prepared by anionically polymerizing about 85% of an initial charge of 18.76 lbs. of isoprene in cyclohexane. The polymerization reaction was promoted by sec-butyllithium in the absence of any randomizing compounds. The living isoprene blocks had at least 93% 1,4-polymerized isoprene units. Polymerization continued after the addition of 1.28 lbs. of styrene until the number average molecular weight of the copolymer was 181,200. The copolymer had a polystyrene content of 5.6% and the molecular weight of block polystyrene was 7,100 as measured GPC prior to hydrogenation according to Example 1.

The copolymer was hydrogenated as described for Example 1. Hydrogenation of the isoprene units also reduced the polystyrene content to 3.6%. The copolymer was not cyclone finishable as a polymer crumb.

The hydrogenated copolymer was added to oil compositions as described in Example 1. The low temperature viscosity of the oil compositions were measured according to ASTM D-4684 and the results are reported in the following Table.

EXAMPLE 8 (Comparison)

Living isoprene blocks were prepared by anionically polymerizing about 100% of an initial charge of 19.33 lbs. of isoprene in cyclohexane. The polymerization reaction was promoted by sec-butyllithium in the absence of any randomizing compounds. The living isoprene blocks had at least 93% 1,4-polymerized isoprene units. Polymerization continued after the addition of 0.69 lbs. of styrene until the number average molecular weight of the copolymer was 180,000. The copolymer had a polystyrene content of 3.3% and a polystyrene block having a molecular weight of 5,800 as measured by standard GPC prior to hydrogenation.

The copolymer was hydrogenated as described for Example 1. Hydrogenation reduced the polystyrene content to 2.7%. The copolymer was cyclone finishable as a polymer crumb.

The hydrogenated copolymer was added to oil compositions as described in Example 1. The low temperature viscosity of the oil compositions were measured according to ASTM D-4684 and the results are reported in the following Table.

EXAMPLE 9 (Comparison)

Living isoprene blocks were prepared by anionically polymerizing about 100% of an initial charge of 14.04 lbs. of isoprene in cyclohexane. The polymerization reaction was promoted by sec-butyllithium in the absence of any randomizing compounds. The living isoprene blocks had at least 93% 1,4-polymerized isoprene units. Polymerization continued after the addition of 0.97 lbs. of styrene until the number average molecular weight of the copolymer was 189,700. The copolymer had a polystyrene content of 6.4% and a polystyrene block having a molecular weight of 13,300 as measured by standard GPC prior to hydrogenation.

The copolymer was hydrogenated as described for Example 1. Hydrogenation reduced the polystyrene content to 6.2%. The copolymer was recovered as a solid polymer crumb which did not exhibit cold flow.

The hydrogenated copolymer was added to oil compositions as described in Example 1. The low temperature viscosity of the oil compositions were measured according to ASTM D-4684 and the results are reported in the following Table.

EXAMPLE 10 (Comparison)

Living isoprene blocks were prepared by anionically polymerizing about 100% of an initial charge of 28.50 lbs. of isoprene in cyclohexane. The polymerization reaction was promoted by sec-butyllithium in the absence of any randomizing compounds. The living isoprene blocks had at least 93% 1,4-polymerized isoprene units. Polymerization continued after the addition of 1.50 lbs. of styrene until the number average molecular weight of the copolymer was 207,000. The copolymer had a polystyrene content of 5.9% and a polystyrene block having a molecular wieght of 14,000 as measured by standard GPC prior to hydrogenation.

The copolymer was hydrogenated as described in Example 1 although the extent of hydrogenation was not determined. The copolymer was cyclone-finishable as a polymer crumb which did not exhibit cold flow.

The hydrogenated copolymer was added to oil compositions as described in Example 1. The low temperature viscosity of the oil compositions were measured according to ASTM D-4684 and the results are reported in the following Table.

hydrogenation of the isoprene presents a substantial risk of preparing a non-finishable polymer that must be cleaned from the process equipment. Comparing Examples 1-3 to Comparative Example 8, the addition of higher amount of styrene in an A—A/B—B copolymer instead of an A—B copolymer can result in cyclone-finishable copolymers which have improved properties.

Acceptable low temperature viscosities for modern engines are less than 300 poise with lower values being preferred. Examples 1 and 3 exhibited the lowest viscosity for a 5W-30 oil and a 10W-40 oil with respect to the copolymers of this invention. Comparative Example 7 yielded a low viscosity for a 10W-40 oil, but the copolymer could not be cyclone-finished as a solid polymer crumb as previously stated. Comparative Examples 6, 9, and 10 establish that larger amounts of polystyrene in the copolymers leads to excessive low temperature viscosities.

While the present invention has been described and illustrated by reference to particular embodiments thereof, it will be appreciated by those skilled in the art that the same lends itself to variations not necessarily illustrated herein. For this reason, then, reference should be made solely to the appended claims for purposes of determining the true scope of the present invention.

Having thus described and illustrated the present invention, what is claimed is:

1. A cyclone-finishable polymeric viscosity index improver, produced by the process of:
    anionically polymerizing a copolymer comprising:
        a number average molecular weight between 125,000 and 275,000;
        from 90 to 98 percent by weight of isoprene,

TABLE

| | Total MW | Polystyrene Content | | | Polystyrene MW$^b$ | Visc., poise$^c$ | |
| | | Initial wt % | Final wt % | Net Loss$^a$ | | 5W-30, @ −30° C. | 10W-40, @ −25° C. |
| --- | --- | --- | --- | --- | --- | --- | --- |
| Examples | | | | | | | |
| 1 | 189,100 | 6.5 | 5.1 | 22% | 7,800 | 207 | 197 |
| 2 | 201,400 | 6.2 | 5.4 | 13% | 9,100 | 239 | 197 |
| 3 | 231,000 | 6.4 | 4.5 | 30% | 10,800 | 247 | 178 |
| 4 | 262,400 | 6.3 | — | — | 9,900 | 232 | 227 |
| 5 | 204,800 | 6.8 | 5.8 | 15% | 10,200 | 282 | 238 |
| Comparisons | | | | | | | |
| 6 | 216,400 | 6.9 | 6.5 | 6% | 11,300 | 304 | 242 |
| 7$^d$ | 181,200 | 5.6 | 3.6 | 36% | 7,100 | 227 | 189 |
| 8 | 180,000$^e$ | 3.3 | 2.7 | 18% | 5,800 | 248 | 203 |
| 9 | 189,700$^e$ | 6.4 | 6.2 | 3% | 13,300 | 310 | 259 |
| 10 | 207,000$^e$ | 5.9 | — | — | 14,000 | — | 325 |

$^a$Hydrogenation increases copolymer weight giving an appearance of about a 3% loss in polystyrene. Thus, Example 9 indicates that styrene units were not hydrogenated.
$^b$Total blocky segments of polystyrene measured prior to hydrogenation by GPC after ozone degradation which excludes isolated or terminal styrene units.
$^c$A viscosity less than 300 is acceptable if the oil compositions do not exhibit a yield stress. Yield stresses were not exhibited.
$^d$Not cyclone-finishable as a solid crumb
$^e$Diblock having no copolymer block Examples 1-5 exemplify sufficient hydrogenation of the preferred A—A/B—B copolymers to provide both cyclone-finishability and good low temperature viscosity. Comparative Example 6 represents an A—A/B—B copolymer having insufficient hydrogenation of styrene units (about 3%) to provide good low temperature viscosity. Comparative Example 7 represents an A—A/B—B copolymer having too few polystyrene segments, as a result of too many hydrogenated styrene units (about 36%), to be cyclone finishable as a solid polymer.

Comparative Example 8, a sequential diblock copolymer, had a good balance of properties although outside the scope of the present invention. Polymerization of such small styrene blocks in diblock copolymers is difficult to control in commercial processes and subsequent wherein at least 85% of the isoprene units have the 1,4-configuration;
from 10 to 2 percent by weight of a monoalkenyl aromatic hydrocarbon; and
a structure of A—A/B wherein A is a homopolymer block of the isoprene and A/B is a copolymer block of the isoprene and the monoalkenyl aromatic hydrocarbon, the homopolymer block comprising at least 60% of the copolymer by weight; and
hydrogenating at least 98% of the isoprene and from 10% to 30% of the monoalkenyl aromatic hydrocarbon.

2. The viscosity index improver of claim 1 wherein A is a homopolymer block of isoprene having a molecular weight between 90,000 and 225,000.

3. The viscosity index improver of claim 1 wherein the monoalkenyl aromatic hydrocarbon is styrene.

4. The viscosity index improver of claim 3 wherein, prior to hydrogenation, the copolymer has the structure A—A/B—B wherein the copolymer molecular weight is between 150,000 and 240,000, the isoprene content is between 93% and 97%, the styrene content is between 7% and 3%, the homopolymer block of isoprene comprises at least 75% of the copolymer by weight, and B is a homopolymer block of styrene having a number average molecular weight of at least 4,000.

5. The viscosity index improver of claim 4 wherein at least 93% of the isoprene units have the 1,4-configuration and B is a homopolymer block of styrene having a number average molecular weight of at least 6,000.

6. The viscosity index improver of claim 5 wherein after hydrogenation the copolymer molecular weight is between 190,000 and 210,000 and the styrene content is between 6 and 4% by weight.

* * * * *